United States Patent
Harada

(10) Patent No.: US 8,407,695 B2
(45) Date of Patent: Mar. 26, 2013

(54) CONTROL DEVICE SETTING METHOD AND PROGRAM

(75) Inventor: Seiji Harada, Hino (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 665 days.

(21) Appl. No.: 12/575,741

(22) Filed: Oct. 8, 2009

(65) Prior Publication Data

US 2010/0095295 A1 Apr. 15, 2010

(30) Foreign Application Priority Data

Oct. 10, 2008 (JP) ................................. 2008-263886

(51) Int. Cl.
*G06F 9/445* (2006.01)
(52) U.S. Cl. ........ 717/176; 717/174; 717/175; 717/177; 717/178
(58) Field of Classification Search .................. None
See application file for complete search history.

(56) References Cited

U.S. PATENT DOCUMENTS

| | | | | |
|---|---|---|---|---|
| 5,555,416 | A * | 9/1996 | Owens et al. | 717/178 |
| 5,832,191 | A * | 11/1998 | Thorne | 358/1.15 |
| 5,860,012 | A * | 1/1999 | Luu | 717/175 |
| 6,138,153 | A * | 10/2000 | Collins et al. | 709/221 |
| 7,064,856 | B2 * | 6/2006 | Fu et al. | 358/1.18 |
| 7,081,969 | B1 * | 7/2006 | Motamed et al. | 358/1.16 |
| 7,689,673 | B2 * | 3/2010 | Kemp et al. | 709/220 |
| 8,151,280 | B2 * | 4/2012 | Sather et al. | 719/321 |
| 2002/0085047 | A1 * | 7/2002 | Aritomi | 345/853 |
| 2003/0093768 | A1 * | 5/2003 | Suzuki | 717/100 |
| 2004/0196491 | A1 * | 10/2004 | Uchino | 358/1.15 |
| 2005/0044200 | A1 * | 2/2005 | Aritomi | 709/223 |
| 2007/0288916 | A1 * | 12/2007 | Harada | 717/174 |
| 2008/0186532 | A1 * | 8/2008 | Ogasawara | 358/1.15 |
| 2009/0031330 | A1 * | 1/2009 | Lee et al. | 719/327 |
| 2009/0033982 | A1 * | 2/2009 | Hwang et al. | 358/1.15 |

FOREIGN PATENT DOCUMENTS

| | | | |
|---|---|---|---|
| JP | 2000-181641 A | 6/2000 | |
| JP | 2001-014123 A | 1/2001 | |

OTHER PUBLICATIONS

Partial European Search Report dated Apr. 8, 2011, issued in the corresponding European Application No. 09171907.0-1245.

* cited by examiner

*Primary Examiner* — Henry Tsai
*Assistant Examiner* — Jing-Yih Shyu
(74) *Attorney, Agent, or Firm* — Buchanan Ingersoll & Rooney PC

(57) ABSTRACT

Execution is provided of at least: the first processing for making the installer software store the group information that relates to information which classifies a plurality of apparatuses into groups and specifies the apparatuses belonging to each group or the address information indicating the location storing this group information, at the time of building the installer software for installing the universal control software that provides universal control of a plurality of the apparatuses; the second processing for notifying about the group information or address information to prompt the group setting of a plurality of the apparatuses when installing the universal control software using installer software; and the third processing for selecting an apparatus as the object of control from among the apparatuses specified by group information acquired from the storage location having been notified or specified by the address information, when universal control software is executed.

8 Claims, 7 Drawing Sheets

40: GROUP SETTING SCREEN

41: PRINTER SELECTION SCREEN

42: PRINTER SELECTION SCREEN

10: PRINTING SYSTEM

CONTROL DEVICE SETTING METHOD AND PROGRAM

This application is based on Japanese Patent Application No. 2008-263886 filed on Oct. 10, 2008 with Japanese Patent Office, the entire content of which is hereby incorporated by reference.

BACKGROUND OF THE INVENTION

The present invention relates to a control device setting method and program, particularly to a method and program for setting, out of a plurality of apparatuses on the network, a group of image forming apparatuses from which an object of control is to be chosen.

In recent years, there has been a widespread use of printing apparatuses such as printers and digital multi-functional peripherals (hereinafter referred to as "image forming apparatuses"). When the image forming apparatus as a network printer is used to perform printing, a document is created by using the document creating application installed in the user terminal linked with the network, and is converted into the print data in the form of PDL (Page Description Language), using the software (printer driver) for controlling the image forming apparatus. Then the data is sent to the image forming apparatus, which analyzes the print data, generates the intermediate data, converts it into bitmap data, and outputs it to a paper medium.

The aforementioned printer driver is normally formed to conform to each image forming apparatus. To ensure output from a plurality of image forming apparatuses linked to the network, a plurality of printer drivers must be installed and this involves complicated work procedures. To solve this problem, a printer driver (hereinafter referred to as "universal printer driver") has been put into commercial use in recent years, which is compatible with a plurality of image forming apparatuses and capable of selecting an image forming apparatus as the output destination in every execution of a printing job.

Use of the aforementioned universal printer driver ensures that all of the image forming apparatuses over the network can be possible output destinations. However, if there are a large number of image forming apparatuses as possible output destinations, an appropriate image forming apparatus must be selected from among a large number of them. This will involve a complicated work procedure especially for those not fully familiar with the work. Further, in the universal printer driver, output can be made to any image forming apparatus over the network (any image forming apparatus over the network is accessible). Thus, an unauthorized user may access the apparatus, for example, and such security problems may arise. To solve such problems, when a universal printer driver is installed for each user terminal, a group of the image forming apparatuses of permitted output destinations must be set for each user terminal.

For the aforementioned group setting, the Japanese Unexamined Patent Publication No. 2000-181641 discloses an information processing apparatus wherein access restrictions are imposed by sending the group template file containing the user access administration information to other clients. Further, the Japanese Unexamined Patent Publication No. 2001-14123 discloses the printer access control system wherein a printer server is used to impose restrictions on access to the printer group for each user.

According to the Japanese Unexamined Patent Publication No. 2000-181641, however, to ensure that the group setting of a certain user is used by another user, the latter user is required to perform the operation of acquiring the group template file with group information described therein. It is not practical to request such complicated operations to be performed by a user not sufficiently familiar with handling the computer. Further, accessibility to all image forming apparatuses is maintained before the group template file is acquired by each user and is set on the universal printer driver. Thus, this technique fails to solve the security management problem.

Further, according to the Japanese Unexamined Patent Publication No. 2001-14123, an administration apparatus such as a printer server is required to ensure that the printer server executes restrictions on access for each user. This involves a complicated system structure, and application of this technique to the existing system is accompanied by difficulties.

In view of the problems described above, it is a major object of the present invention to provide a control device setting method and program that ensure simple selection of an apparatus as an output destination.

Another object of the present invention is to provide a control device setting method and program capable of ensuring reliable imposition of access restrictions.

SUMMARY

To achieve at least one of the abovementioned objects, a control device setting method and program reflecting one aspect of the present invention comprise:

1. A computer readable recording medium which stores installer building software for building installer software which installs universal control software for providing universal control of a plurality of apparatuses, wherein a computer executing the installer building software functions as an installer building section, the installer building section making the installer software store group information or an address information indicating a storage location of the group information when building the installer software, the group information relating to information which classifies the plurality of apparatuses into groups and specifies one or more apparatuses belonging to each of the groups.

2. The computer readable recording medium of the item 1, wherein the computer executing the installer building software further functions as a group setting creating section for creating the group information.

3. A computer readable recording medium which stores installer software for installing universal control software for providing universal control of a plurality of apparatuses, wherein a computer executing the installer software functions as:

an installation executing section for installing the universal control software;

an instructed group information storage section which stores group information or an address information indicating a storage location of the group information, the group information relating to information which classifies the plurality of apparatuses into groups and specifies one or more apparatuses belonging to each of the groups ; and a group setting instruction section which notifies the universal control software having been installed about the group information or the address information to prompt group setting of the plurality of apparatuses.

4. The computer readable recording medium of the item 3, wherein the plurality of apparatuses are classified into a plurality of groups, and wherein the group setting instruction section identifies a terminal of a user which is installing the universal control software, specifies a predetermined group corresponding to the user among the plurality of groups, and notifies the universal control software about the group information which specifies one or more apparatuses belonging to the predetermined group or address information of the group information.

5. A computer readable recording medium which stores universal control software for providing universal control of a plurality of apparatuses, wherein a computer executing the universal control software functions as:

a group setting instruction receiving section for receiving from installer software for installing the universal control software, group information or an address information indicating a storage location of the group information, the group information relating to information which classifies the plurality of apparatuses into groups and specifies one or more apparatuses belonging to each of the groups;

a set group information storage section for storing the group information or the address information; and an apparatus selecting section for selecting an apparatus as an object of control out of the one or more apparatuses specified by the group information stored in the storage section or acquired from the storage location indicated by the address information.

6. The computer readable recording medium of the item 5, wherein the group setting instruction receiving section receives from the installer software, group information specifying one or more apparatuses belonging to a predetermined group corresponding to a terminal which is installing the universal control software or the address information of the group information of the predetermined group, and the apparatus selecting section prompt a user to select an apparatus as an object of control out of the one or more apparatuses belonging to the predetermined group.

7. The computer readable recording medium of any one of the items 1-6, wherein the apparatuses are image forming apparatuses and the universal control software is a printer driver.

DETAILED DESCRIPTION OF THE PREFERRED EMBODIMENTS

Figure 1:
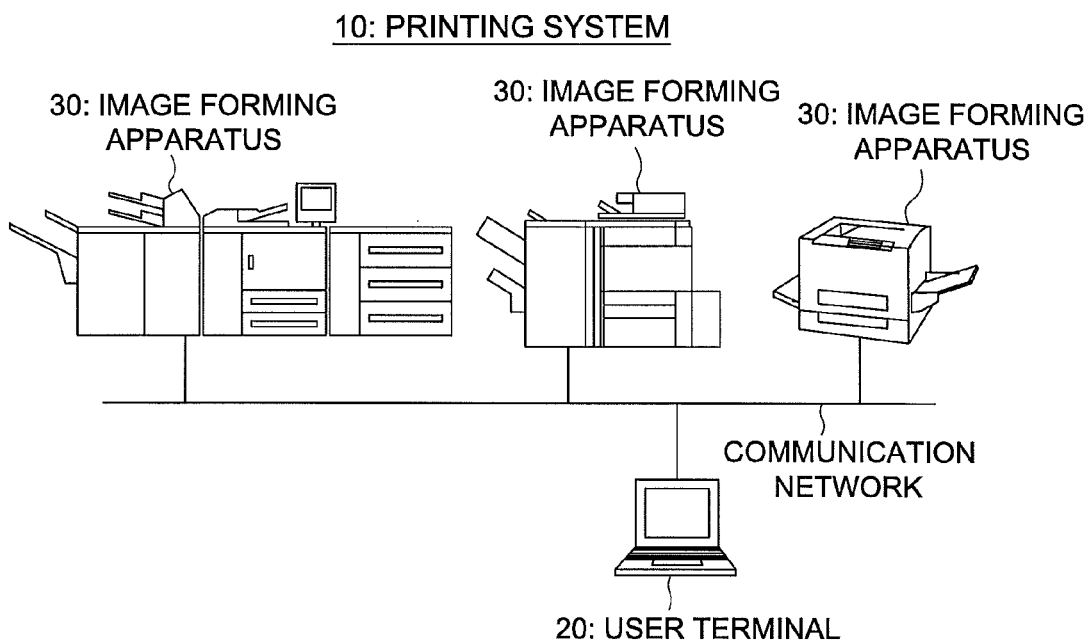
FIG. 1 is a diagram schematically representing the structure of a printing system of a first example of the present invention.

As described in the BACKGROUND OF THE INVENTION, one of the techniques known in the conventional art is a universal printer driver (e.g., universal printer driver of Hewlett-Packard Company) that permits use of a plurality of image forming apparatuses linked to the network. Use of this universal printer driver allows the user to access all of the image forming apparatuses over the network. Thus, the user is required to set an appropriate group as an output destination. In the conventional art, after the universal printer driver has been installed, the user himself acquires the group information or a printer server is used to administer the image forming apparatus of the output destination.

The former method, however, requires the work of acquiring the group information, and a problem has been found in that access to an inappropriate image forming apparatus cannot be disabled until group setting has been completed. In the meantime, the latter method requires a printer server to be arranged on the system. This involves a complicated system structure and causes difficulties in the application to the existing system.

Another means known in the conventional art is the installer building software (e.g., driver packaging utility for full-color multi-functional peripheral bizhub C650 of Konica Minolta) for building the installer software that installs a universal printer driver. This installer building software allows the customized installer software to be built, however the items that can be set by this software are restricted to such printing conditions as color/monochromatic conditions alone. This software fails to set the output destination group.

Thus, to ensure simple group setting without having to set such an administration apparatus as a printer server and without requiring the user to perform complicated operations, the present embodiment has group information embedded in the installer software for installing a universal printer driver so that a universal printer driver in which group information corresponding to the user has been registered in advance can be installed.

To put it more specifically, the installer building software for building installer software for installing the universal printer driver is provided with the function of creating group information, and the installer software is equipped with the function of instructing the group setting based on the group information having been created. The universal printer driver is provided with the function of receiving a group setting instruction from the outside, so that the group setting can be automatically performed after the universal printer driver has been installed in the computer.

This arrangement ensures that candidates for the output destination corresponding to each user are displayed on the universal printer driver, and provides easy selection of the output destination. This arrangement also allows the administrator to conduct group setting and reliable imposition of restrictions on access for each user.

EXAMPLE 1

Figure 2:
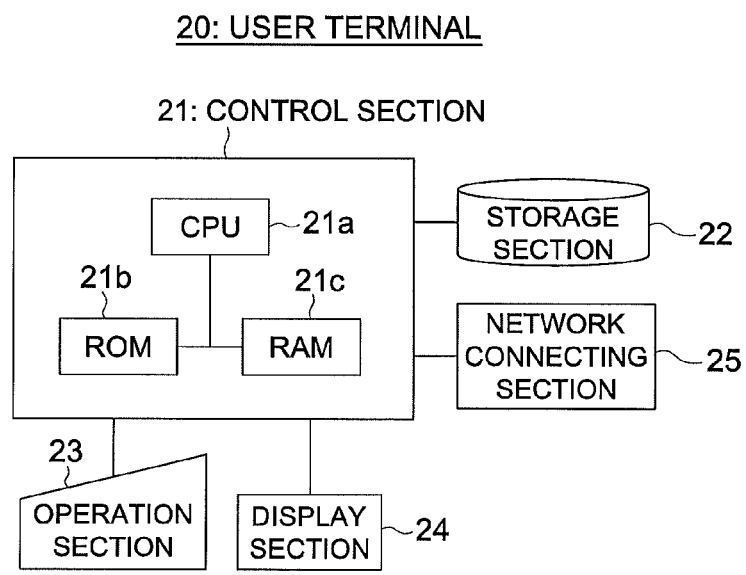
FIG. 2 is a block diagram representing the structure of a user terminal of a first example of the present invention.
Figure 3:
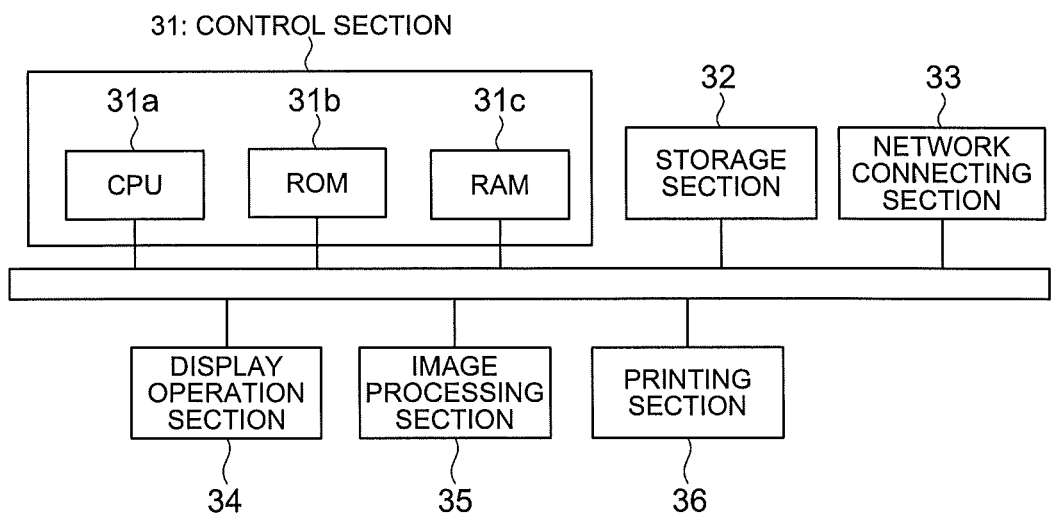
FIG. 3 is a block diagram representing the structure of an image forming apparatus of a first example of the present invention.
Figure 4:
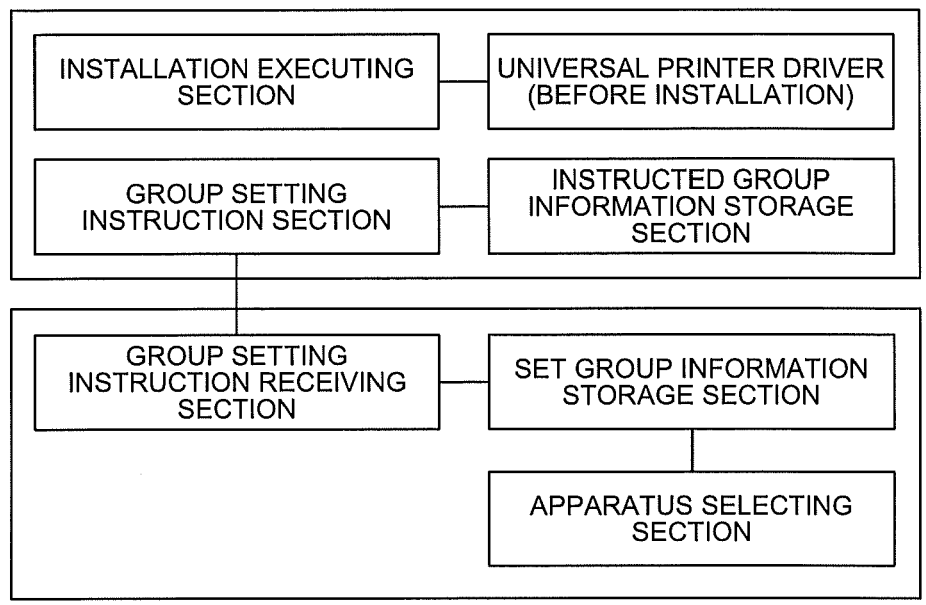
FIG. 4 is a block diagram representing the function of the universal printer driver and installer software of a first example of the present invention.
Figure 5:
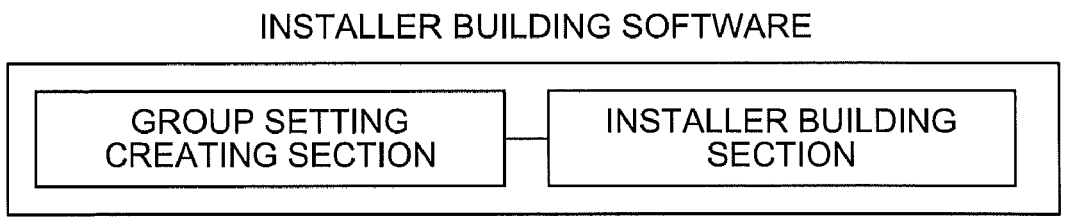
FIG. 5 is a block diagram representing the function of the installer building software of a first example of the present invention.
Figure 6:
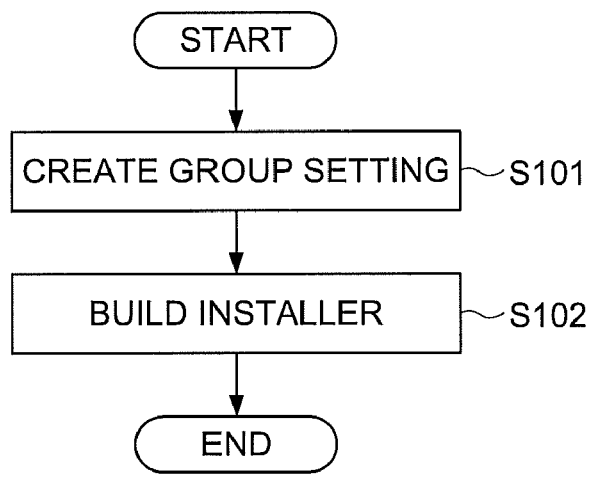
FIG. 6 is a flow chart representing the control procedure (a flow showing the process of building the installer software) in the user terminal of a first example of the present invention.
Figure 7:
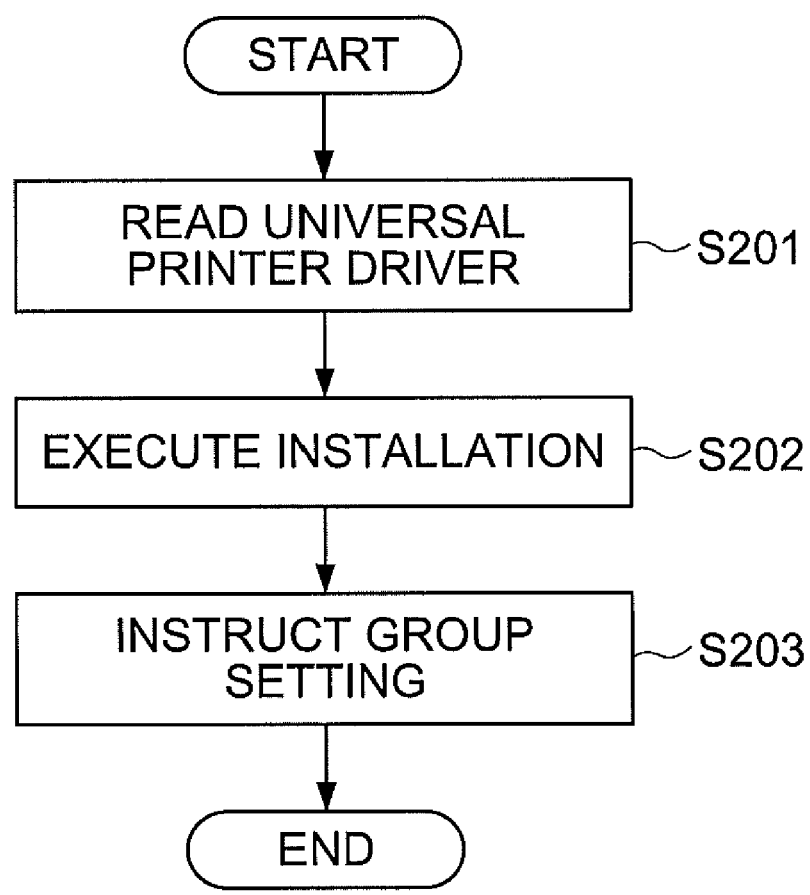
FIG. 7 is a flow chart representing the control procedure (a flow showing the processes ranging from installation of a universal printer driver to instruction of group settings) in the user terminal of a first example of the present invention.
Figure 8:
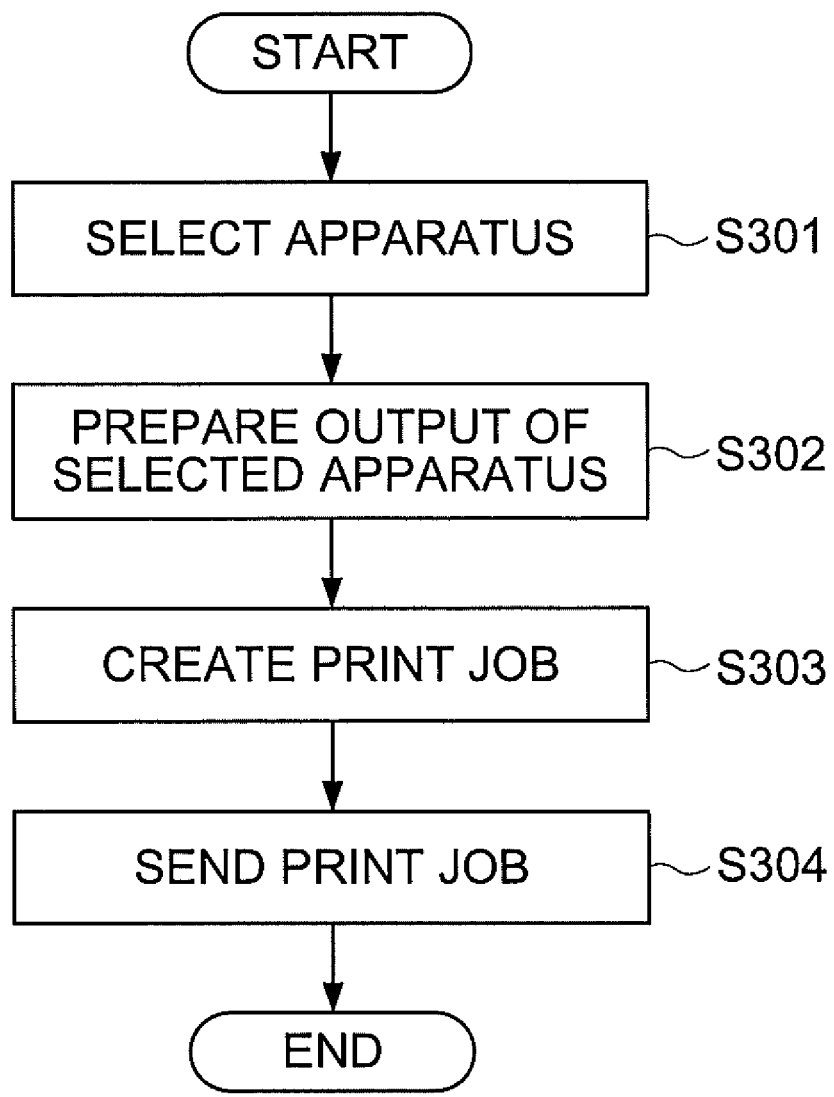
FIG. 8 is a flow chart representing the control procedure (a flow showing the process of sending a printing job by the universal printer driver) in the user terminal of a first example of the present invention.
Figure 9:
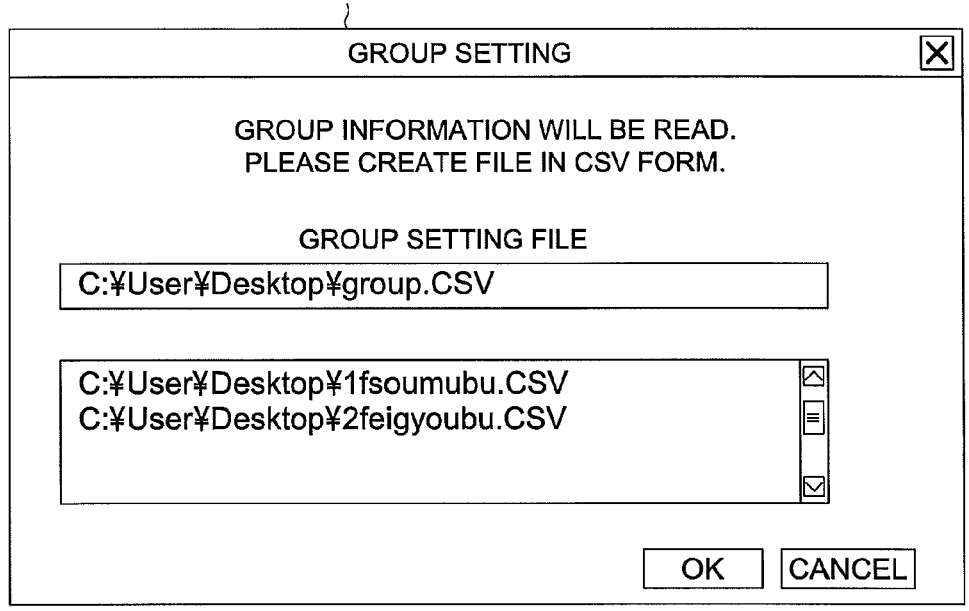
FIG. 9 is a diagram showing an example of the structure of the screen (group setting screen) displayed on a display section in the user terminal of a first example of the present invention.
Figure 10:
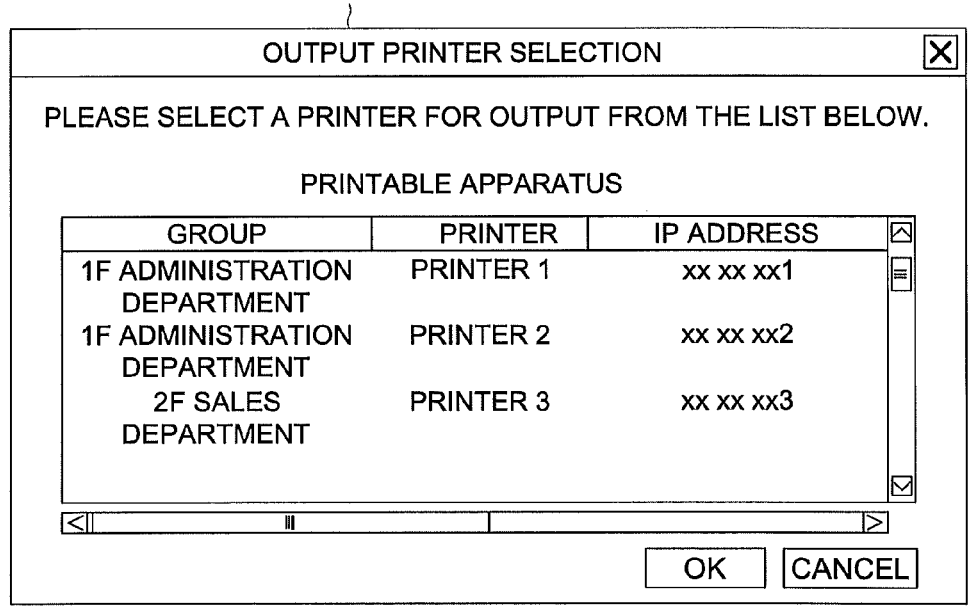
FIG. 10 is a diagram showing an example of the structure of the screen (printer selection screen) displayed on a display section in the user terminal of a first example of the present invention.

To show one embodiment of the aforementioned present invention in greater detail, the following describes the control device setting method and program of a first example of the present invention with reference to FIGS. 1 through 10. FIG. 1 is a diagram schematically representing the structure of a printing system in the present example. FIG. 2 is a block diagram representing the structure of a user terminal. FIG. 3 is a block diagram representing the structure of an image forming apparatus. FIG. 4 is a block diagram representing the functions of the universal printer driver and installer software. FIG. 5 is a block diagram representing the function of the installer building software. FIGS. 6 through 8 are the flow charts representing the control procedure in the user terminal in the present example. FIGS. 9 and 10 are diagrams showing examples of the structures of the screens displayed on a display section in the user terminal.

As shown in FIG. 1, the printing system 10 of the present example includes a computer terminal (hereinafter referred to as "user terminal 20") that creates a document by an application and creates the printing job of the page description language by the universal printer driver to give printing instructions, and a plurality of image forming apparatuses 30 such as printers or digital multi-functional peripherals which execute printing in conformity to the printing job from the user terminal 20. The user terminal 20 and image forming apparatuses 30 are connected via the communication network such as LAN (Local Area Network) or WAN (Wide Area Network). The following describes the details of each component.

[User Terminal]

As shown in FIG. 2, the user terminal 20 includes a control section 21, storage section 22, operation section 23, display section 24 and network connecting section 25.

The control section 21 includes a CPU (Central Processing Unit), ROM (Read Only Memory) and RAM (Random Access Memory). The universal control software (universal printer driver) that universally controls the OS (Operating System), document creating application and a plurality of image forming apparatuses 30 is normally read from the ROM21b or storage section 22 into the RAM21c, and is executed on the CPU 21a.

As shown in FIG. 4, the aforementioned universal printer driver allows the control section 21 to serve as a group setting instruction receiving section, set group information storage section, apparatus selecting section and others. The group setting instruction receiving section receives the group setting instruction from the installer software to be described later. The set group information storage section stores the group information that specifies the image forming apparatus 30 belonging to the group to be selected by the apparatus selecting section. The apparatus selecting section allows the image forming apparatus 30 to be selected as the object of output from the group.

Further, the universal printer driver provided with the aforementioned functions is installed into the OS in the user terminal 20 by the installer software. As shown in FIG. 4, this installer software allows the control section 21 to serve as an installation executing section, group setting instruction section, instructed group information storage section and others. Further, this installer software includes a universal printer driver as internal data. The installation executing section conducts execution processing to install the universal printer driver in the OS. The group setting instruction section provides group setting instructions to the universal printer driver having been installed. The instructed group information storage section stores the group information for giving instructions to the universal printer driver.

Further, the aforementioned installer software is built by installer building software. As shown in FIG. 5, this installer building software allows the control section 21 to serve as a group setting creation section, and installer building section. The group setting creation section classifies a plurality of image forming apparatuses 30 into groups and creates group information for specifying the image forming apparatus 30 belonging to each group. The installer building section ensures that the group information created by the group setting creation section is stored in the instructed group information storage section, whereby the installer software is built.

The storage section 22 includes a flash memory or HHD (Hard Disk Drive), and stores various forms of data (e.g., group information) and programs (e.g., universal printer driver).

The operation section 23 includes a keyboard or mouse, and is used to operate the group settings at the time of starting the installer building software, and to select the image forming apparatus 30 at the time of starting the universal printer driver.

The display section 24 is made up of an LCD (Liquid Crystal Display), an organic electroluminescent display or others. Various forms of screens (e.g., group setting screen and printer selection screen to be described later) are displayed on the screen in conformity to the display signal from the control section 21.

The network connecting section 25 includes an NIC (Network Interface Card) or modem, and is used for connection with the image forming apparatus 30.

In this Example, the installer building software is started by the user terminal 20 and installer software is built. The installer software is started by the same user terminal 20 and the universal printer driver is installed. It is also possible to arrange such a configuration that the installer building software and installer software are started by different user terminals 20 (i.e., the universal printer driver is installed in a user terminal different from the user terminal for building the installer software).

[Image Forming Apparatus]

As shown in FIG. 3, the image forming apparatus 30 includes a CPU 31a, ROM31b, RAM31c, storage section 32, network connecting section 33, display operation section 34, image processing section 35, and printing section 36. These components are connected via a bus.

The ROM31b stores a program for controlling operations of the entire image forming apparatus 30. The RAM31c stores the data required for control by the CPU 31a and the data that requires temporary storage during the control operation. The CPU 31a in collaboration with the ROM31b and RAM31c serves as the control section 31 that controls the operations of the entire image forming apparatus.

The storage section 32 includes a flash memory or HDD, and stores the printing job acquired from the user terminal 20.

The network connecting section 33 is an interface for connection with the communication network such as the NIC or modem, and receives the printing job from the user terminal 20.

The display operation section 34 is made up of the display section such as an LCD, and the operation sections such as the touch panel covering the display section. In conformity to the display signal from the CPU 31a, the display operation section 34 displays the icon, key button and various forms of settings required for printing on the LCD or the like. At the same time, the display operation section 34 ensures that the operation signals inputted from the touch panel and others are outputted to the CPU 31a.

The image processing section 35 analyzes the printing job acquired from the user terminal 20 through the network connecting section 33 and creates the image data in a bitmap format. It is also possible to arrange such a configuration that processing by the image processing section 35 is implemented by the RIP (Raster Image Processor) controller linked to the network. In this case, the printing job is analyzed by the RIP controller, and the image data in a bitmap format is created, whereby the image data is sent to the image processing apparatus 30.

Based on the bitmap data created by the image processing section 35, the printing section 36 performs printing operations in conformity to the printing mode specified by the aforementioned parameters. To put it more specifically, the amount of light conforming to the bitmap data is applied by the exposure apparatus to the photoreceptor drum charged by the charging device, whereby an electrostatic latent image is formed. The toner charged by the development apparatus is attached to the image, and the toner image is transferred onto the paper medium through a primary transfer roller and secondary transfer belt. Then the fixing operation is performed by the fixing apparatus.

The following describes the procedure for installing the universal printer driver into the user terminal 20 in the printing system of the aforementioned structure. In the first place, referring to FIG. 6, the following describes the flow of the processes for setting of the group by the installer building software to build the installer software. In the following description, it is assumed that the image forming apparatus 30 is a printer, the installer building software is stored in the user terminal 20 of the administrator in advance, and the system is ready for operation.

In the first place, the administrator operates the operation section 23 of the user terminal 20 (e.g., double-clicks on the icon on the desktop of the OS) to start the installer building software on the OS.

In Step S101, using the function of the group setting creation section of the installer building software having been started, the administrator creates group information. In this case, it is assumed that the group information shown in Table 1 through 3 has been created by the administrator.

TABLE 1

| <Group> |
| --- |
| Group name |
| 1F Administration department |
| 2F Sales department |

TABLE 2

| <1F Administration department> | |
| --- | --- |
| Printer name | Address |
| Printer 1 | xx.xx.xx.1 |
| Printer 2 | xx.xx.xx.2 |

TABLE 3

| <2F Sales department> | |
| --- | --- |
| Printer name | Address |
| Printer 3 | xx.xx.xx.3 |

The following more specifically describes the processing to be performed in this Step. In this Example, the group information is composed of a group designation file and printer designation file.

The group designation file includes the group name and the file name of the printer designation file with the group details described therein. The file name of this group designation file is the "group.csv" which is fixed without being changed.

The printer designation file includes the name of the printer contained in a specific group, and the address associated therewith (e.g., IP (Internet Protocol) address). The name of this printer designation file is defined within the group designation file. It should be noted that the printer designation file can be created in any desired format. The CSV (Comma Separated Values) file is used in this case.

Using the application (e.g., MS Excel) that permits any desired CSV file to be edited and stored, the administrator creates the following CSV file:

<group.csv>
groupname, filename
1F administration department, 1fsoumubu.csv
2F sales department, 2feigyoubu.csv
<1fsoumubu.csv>
printername, address
printer 1, xx.xx.xx.1
printer 2, xx.xx.xx.2
<2feigyoubu.csv>
printername, address
printer 3, xx.xx.xx.3

Then the administrator operates the operation section 23 so that all of the files having been created are read by the installer building software. FIG. 9 shows an example of the GUI (group setting screen 40) of the group setting creation section that reads the file. It should be noted that the group setting creation section can use the CSV file directly as it is, or can create group information by converting it into the data structure defined internally. Here the CSV file is used directly.

In Step S102, installer software is built using the function of the installer building section of the installer building software. This installer building section builds the installer software by ensuring that group information created by the group setting creation section is stored in the instructed group information storage section of the installer software.

In this case, all of the CSV files read by the group setting creation section are directly (or may be encoded or compressed into an archive) stored in the instructed group information storage section. The instructed group information storage section includes the CSV file group stored in the HDD and the DLL (Dynamic Link Library) capable of reading the same. The installation executing section (EXE file), universal printer driver (a plurality of files such as DLL) and group setting instruction section (DLL), which have been prepared in advance can be used directly.

The aforementioned procedure ensures the installer software to be built in the OS of the user terminal 20 of the administrator.

Referring to FIG. 7, the following describes the flow of the processes ranging from installation of the universal printer driver by the aforementioned installer software up to instruction of the group setting. If the user terminal 20 for building the installer software is different from the user terminal 20 for installing the universal printer driver, the installer software built in the aforementioned flow is assumed to have been copied in each user terminal 20 via the e-mail or file server.

In the first place, the user starts the installer software on the OS by operating the operation section 23 of the user terminal 20 (e.g., by double-clicking on the icon on the OS desktop (icon linked to the EXE file of the installation executing section)).

In Step S201, the universal printer driver provided internally is read by the function of the installation executing section of the installer software having been started.

In Step S202, installation is executed in the OS of the universal printer driver having been read.

In Step S203, the group setting instruction section of the installer software transfers the group information read from the instructed group information storage section, to the group setting instruction receiving section of the universal printer driver. To put it more specifically, the group setting instruction section reads the DLL file of the group setting instruction receiving section and calls up the group setting instruction receiving capability (function) which the group setting instruction receiving section has. Then the path of the CSV file group is transferred as an argument. The group setting instruction receiving section of the universal printer driver ensures that the group information received is stored in the set group information storage section. The set group information storage section refers to the path of the CSV file group received and copies the CSV file group which has been referred to directly in a predetermined location on the OS system, wherein the CSV file group is stored. If the CSV file group has been encoded or compressed into an archived form, it is converted into data that can be read.

The aforementioned processing allows the universal printer driver to be installed in the OS of the user terminal 20.

Referring to FIG. 8, the following describes the flow up to transferring the printing job to a desired printer by the universal printer driver.

In the first place, when printing instructions have been given by the document creating application on the OS of the user terminal 20 or the like, the universal printer driver installed according to the aforementioned flow starts.

In Step S301, the apparatus selecting section of the universal printer driver reads the group information from the set group information storage section (read as the CSV file or registry information), and the printer selection screen 41 is displayed on the display section 24 of the user terminal 20, as shown in FIG. 10.

In Step S302, when the printer of the output destination has been selected from the printer selection screen 41 of FIG. 10 by the user, the universal printer driver prepares the address of the printer having been selected from the group information as a destination address of the printing job. Here it is assumed that the printer 1 is selected and the printing job is sent to the address "xx.xx.xx.1".

In Step S303, the universal printer driver generates the printing job that is readable for the printer 1.

In Step S304, the universal printer driver sends the printing job to the address "xx.xx.xx.1".

When the group or printer information is to be updated, the installer building software is booted and the group setting is reworked to rebuild the installer software. After the installer software has been re-built, the universal printer driver is re-installed using that installer software.

As described above, the universal printer driver with the group information pre-registered therein has been installed in each user terminal. This arrangement ensures that the image forming apparatus usable in each user terminal 20 can be selected as the output destination, immediately after driver installation. Further, since group information is registered in the universal printer driver in advance, restrictions can be imposed on possible access to the unregistered printers. Further, this arrangement eliminates the need of installing an administration apparatus such as a printer server. Thus, this structure provides simplification of the system structure and enhancement of general versatility.

EXAMPLE 2

Figure 11:
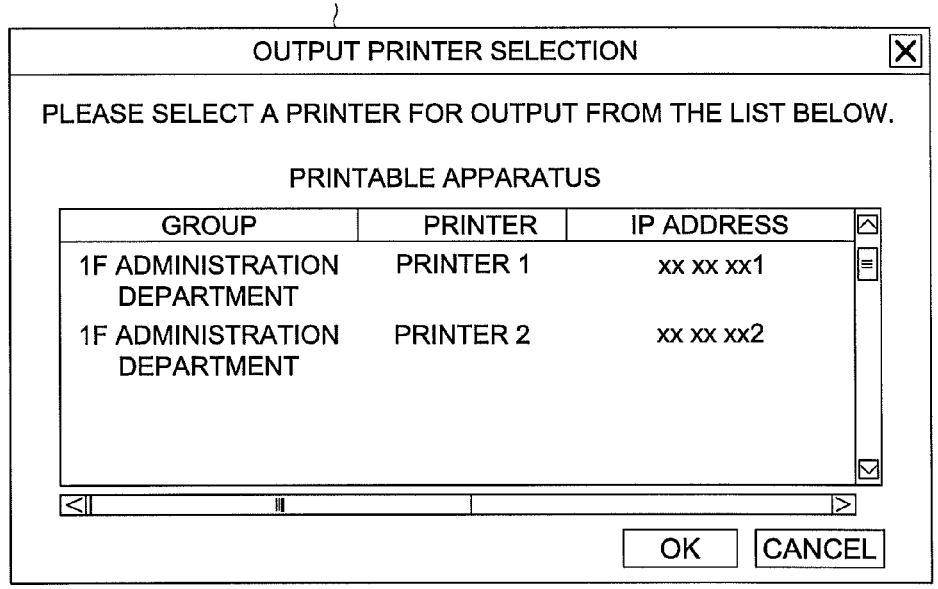
FIG. 11 is a diagram showing an example of the structure of the screen (printer selection screen) displayed on a display section in the user terminal of a second example of the present invention.

The control device setting method and program of the second Example of the present invention will be described with reference to FIG. 11. FIG. 11 shows an example of the structure of the screen displayed on the display section of the user terminal. In this Example, the description of the same components as those of the first Example will be omitted, and only the differences will be described.

In the aforementioned first Example, display is given in such a way that the same printers can be selected by the universal printer driver installed in each user terminal 20, though different printers are suited for the output, depending on the organizational division and post of the user as well as the location of the user terminal 20. Thus, in this Example, the range of the printer selection for each user can be changed when the universal printer driver is installed.

The basic structure of the printing system in this case and the building configuration procedure of the installer software in FIG. 6 are the same as those in the first Example. In the process of group setting creation (Step S101 of FIG. 6), group information is created for each user. Here it is assumed that group information has been created by the administrator as shown in Tables 4 through 7.

TABLE 4

| <Group for user A> Group name |
| --- |
| 1F Administration department |

TABLE 5

| <Group for user B> Group name |
| --- |
| 2F Sales department |

TABLE 6

| <1F Administration department> | |
| --- | --- |
| Printer name | Address |
| Printer 1 | xx.xx.xx.1 |
| Printer 2 | xx.xx.xx.2 |

TABLE 7

| <2F Sales department> | |
| --- | --- |
| Printer name | Address |
| Printer 3 | xx.xx.xx.3 |

This processing will be described in greater detail. In this Example, the group information includes a user designation file, group designation file and printer designation file.

The user designation file contains the user name and the name of the group designation file describing the groups that can be used by the user. The file name is assumed as "user.csv" which is fixed without being changed.

The group designation file includes the group name and the name of the printer designation file describing the details of the group. The file name is defined in the user designation file.

The printer designation file includes the name of the printer contained in a predetermined group and the address associated therewith. The file name is determined in the group designation file. The following shows an example of the aforementioned file group.

<user.csv>
username, filename
user A, usera.csv
user B, userb.csv
<usera.csv>
groupname, filename
1F administration department, 1fsoumubu.csv
<userb.csv>
groupname, filename
2F sales department, 2feigyoubu.csv
<1fsoumubu.csv>
printer 1, xx.xx.xx.1
printer 2, xx.xx.xx.2
<2feigyoubu.csv>
printername, address
printer 3, xx.xx.xx.3

In the aforementioned arrangement, the installation procedure by the installer software of FIG. 7 is the same as that in the first Example. In the group setting instruction (Step S203 of FIG. 7), the installer software identifies the user that employs the user terminal 20 wherein installation has been completed. It should be noted that there is no particular restriction to the method of identifying the user terminal 20. It is possible to identify the user by acquiring the IP address or MAC (Media Access Control) address and referring to the pre-stored Table. Alternatively, the user can be identified by requesting the user ID or password to be inputted. Here it is assumed that the user has been identified as "user A".

The group setting instruction section ensures that the group information for "user A" read from the instructed group information storage section is transferred to the group setting instruction receiving section of the universal printer driver. To put it more specifically, the "user.csv" is read and the group designation file for user A ("usera.csv" in this case) is obtained. Further, "1fsoumubu.csv" is obtained from the "usera.csv". The file name of the "usera.csv" is converted to the "group.csv", and only the "group.csv" and "1fsoumubu.csv" are transferred. The group setting instruction receiving section of the universal printer driver causes the received group information to be stored in the set group information storage section. Thus, only the "group.csv" and "1fsoumubu.csv" are referred to without data on another user (user B in this case) being stored for the user A.

The printing procedure of FIG. 8 is also the same as that of the first Example. In the selection of device (Step S301 of FIG. 8), the apparatus selecting section reads the group information from the set group information storage section and displays the printer selection screen 42 on the computer, as shown in FIG. 11. In this Example, only the "1F administration department" group is available as the group information for "user A". Thus, only this is displayed.

In this Example, when the group or printer information is to be updated, the installer building software is booted and the group setting is reworked to rebuild the installer software. After the installer software has been re-built, the universal printer driver is re-installed using that installer software.

As described above, when the group wherein the user is authorized to gain access is set on each user terminal by the same user, a simpler selection of the image forming apparatus as the output destination is ensured rather than in the first Example. Further, reliable and simple restrictions can be imposed on access by each user.

EXAMPLE 3

Figure 12:
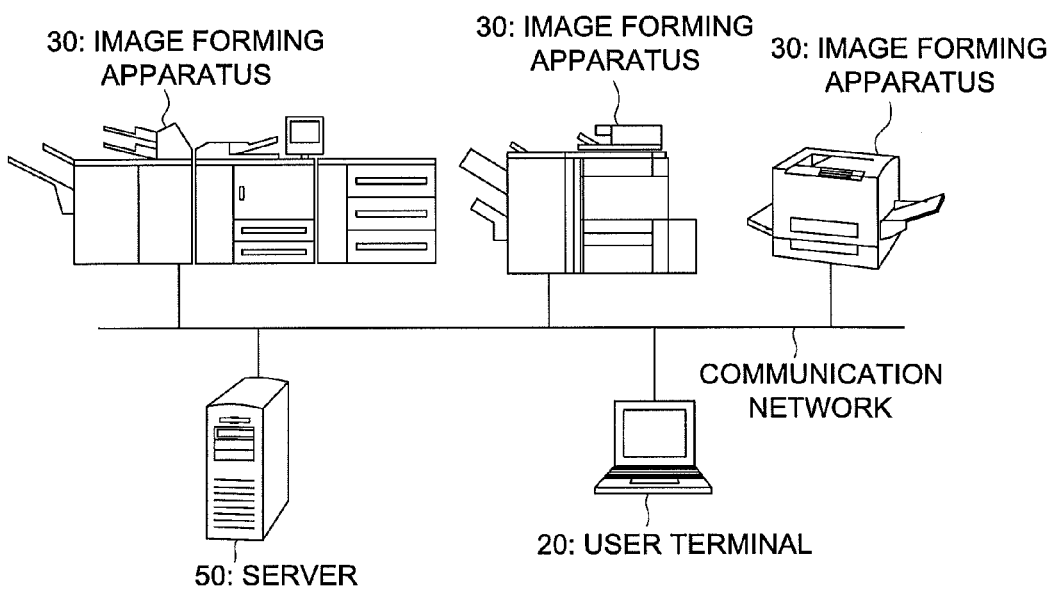
FIG. 12 is a diagram schematically representing the structure of a printing system of a third example of the present invention.

Referring to FIG. 12, the following describes the control device setting method and program of a third Example of the invention. FIG. 12 is a diagram schematically representing the structure of a printing system of the third example of the present invention. In this Example as well, the description of the same components as those of the first and second Examples will be omitted, and only the differences will be described.

In the aforementioned first and the second Examples, arrangements are made in such a way that the group information is registered in the installer software using the user terminal 20 of the administrator. In this case, to update the group information, the installer software must be re-built. Thus, this Example proposes a method of permitting the group information to be updated, without having to re-build the installer software.

As shown in FIG. 12, the printing system of this Example includes a user terminal 20, image forming apparatus 30 and server 50, which are linked via the communication network.

The server 50 includes a control section, storage section and authentication section that are not illustrated. The control section includes a CPU, ROM and RAM, and controls operations of the entire server 50. The authentication section performs authentication based on the information (IP address, MAC address, user ID, password and others) sent from each user terminal 20, and allows access to be made by the authenticated user terminal 20. The storage section stores the group information of each user.

In this Example, the building of installer software of FIG. 6 is performed on the server 50, the group setting creation section of the installer building software sets the group information for each user. Here the same group information as that of the second Example is assumed to have been created by the administrator. The administrator ensures that the group information for "user A" is stored in a location accessible for the "user A" (e.g., ¥¥server¥usera) on the server 50, and the group information for "user B" is stored in a location accessible for the "user B" (e.g., ¥¥server¥userb) on the server 50. To put it more specifically, the "user.csv" specifies each of the paths as follows and arranges them at a location accessible for all of the users on the server 50 (e.g., ¥¥server¥alluser). The following describes an example of the aforementioned file group.

<user.csv>
username, filename
user A, ¥¥server¥usera¥usera.csv
user B, ¥¥server¥userb¥userb.csv \<usera.csv\>
groupname, filename
1F administration department, ¥¥server¥usera¥1fsoumubu.csv
\<userb.csv\>
groupname, filename
2F sales department, ¥¥server¥userb¥2feigyoubu.csv Further, when the installer software is built, the information for gaining access to the group information stored on the server 50 is stored in the instructed group information storage section, whereby the installer is built. Here only the "user.csv" is stored.

Further, the installation procedure of FIG. 7 is the same as that in the first Example. In the group setting instruction (S203 of FIG. 7), the group setting instruction section ensures that the information read from the instructed group information storage section and to be used to gain access to the group information stored on the server 50 is transferred to the group setting instruction receiving section of the universal printer driver. To put it more specifically, only the "user.csv" file is transferred. The group setting instruction receiving section of the universal printer driver causes access information to be stored in the set group information storage section. Here only the "user.csv" file is stored.

The printing procedure of FIG. 8 is the same as that of the first Example. In the selection of device (Step S301 of FIG. 8), the apparatus selecting section reads the group information from the set group information storage section. In this Example, if the "user A" is assumed to have tried printing, the set group information storage section accesses the server 50 according to the information on access to the group information stored in the server 50. The access information is "¥¥server¥usera¥usera.csv", for example.

The server 50 authenticates that the user is "user A", and returns the group information for "user A". In this case, the user A is provided with only the "user.csv" and "1fsoumubu.csv". The set group information storage section returns the group information for "user A" to the apparatus selecting section. The apparatus selecting section allows the printer selection screen 42 to be displayed on the computer, as shown in FIG. 11.

In the aforementioned manner, group information is registered in the server 50. When the universal printer driver is installed, this group information is referred to. This eliminates the need of re-building the installer software every time the group setting is updated, with the result that updating of the group setting is facilitated.

In the aforementioned Examples, the universal printer driver is installed using the installer software. Without the present invention being restricted thereto, the universal printer driver can be installed using the installer pre-set on the OS.

In the aforementioned Examples, descriptions have been made on the cases wherein the image forming apparatus 30 is controlled. However, the user terminal can be used to provide similar control to any desired device that can be controlled.

The present invention is applicable to the method and software for setting the group of the apparatus as an object of control.

The control device setting method and program of the abovementioned embodiments of the present invention ensures easy selection of the apparatus as the output destination, and imposes reliable restrictions on the access.

This is because the universal control software (universal printer driver) with the group information registered previously is installed on each user terminal. Thus, the apparatus as the output destination can be selected from the group by merely installing the universal control software (universal printer driver). Another reason is that restrictions are imposed on access to the apparatus that has not been set by registering the group information in the universal control software (universal printer driver) in advance.

What is claimed is:

1. A non-transitory computer readable recording medium which stores installer building software for building installer software which installs a universal printer driver configured to select an output destination from among a plurality of image forming apparatuses, wherein the installer building software newly builds the installer software as software which is different from the installer building software, a computer executing the installer building software functions as an installer building section, the installer building section making the installer software store group information or an address information indicating a storage location of the group information when building the installer software as new software, the group information relating to information which classifies the plurality of image forming apparatuses into groups and specifies one or more image forming apparatuses belonging to each of the groups;

wherein the plurality of image forming apparatuses are classified into a plurality of groups, and the computer in which the installer software has been built by the installer building software, functions as a group setting instruction section that identifies a terminal of a user which is installing the universal printer driver, specifies a predetermined group corresponding to the user among the plurality of groups, and notifies the universal printer driver about the group information which specifies one or more image forming apparatuses belonging to the predetermined group or address information of the group information.

2. The non-transitory computer readable recording medium of claim 1, wherein the computer executing the installer building software further functions as a group setting creating section for creating the group information.

3. A non-transitory computer readable recording medium which stores installer software for installing a universal printer driver configured to select an output destination from among a plurality of image forming apparatuses, wherein the installer software has been built by installer building software, as software which is different from the installer building software, and wherein a computer executing the installer software functions as:

an installation executing section for installing the universal printer driver;

an instructed group information storage section which acquires group information or an address information indicating a storage location of the group information through the installer building software and stores the group information or the address information, the group information relating to information which classifies the plurality of image forming apparatuses into groups and specifies one or more image forming apparatuses belonging to each of the groups; and a group setting instruction section which notifies the universal printer driver having been installed about the group information or the address information to prompt group setting of the plurality of image forming apparatuses;

wherein the plurality of image forming apparatuses are classified into a plurality of groups, and wherein the group setting instruction section identifies a terminal of a user which is installing the universal printer driver, specifies a predetermined group corresponding to the user among the plurality of groups, and notifies the universal printer driver about the group information which specifies one or more image forming apparatuses belonging to the predetermined group or address information of the group information.

4. A non-transitory computer readable recording medium which stores a universal printer driver that is installed by an installer software and is configured to select an output destination from among a plurality of image forming apparatuses, wherein the installer software has been built by installer building software, as software which is different from the installer building software, and wherein a computer executing the universal printer driver functions as:

a group setting instruction receiving section for receiving from the installer software, group information or an address information indicating a storage location of the group information, the group information relating to information which classifies the plurality of image forming apparatuses into groups and specifies one or more image forming apparatuses belonging to each of the groups;

a set group information storage section for storing the group information or the address information;

an apparatus selecting section for selecting an image forming apparatus as an object of control out of the one or more image forming apparatuses specified by the group information stored in the storage section or acquired from the storage location indicated by the address information, and the group information or the address information has been acquired by the installer software through the installer building software;

wherein the group setting instruction receiving section receives from the installer software, group information specifying one or more image forming apparatuses belonging to a predetermined group corresponding to a terminal which is installing the universal printer driver or the address information of the group information of the predetermined group, and notifies the universal printer driver about the group information.

5. The non-transitory computer readable recording medium of claim 4, wherein the apparatus selecting section prompts a user to select an image forming apparatus as an object of control out of the one or more image forming apparatuses belonging to the predetermined group.

6. A control device setting method in a system including a plurality of image forming apparatuses and a terminal of a user, the method comprising:

first processing for making installer software store group information or an address information indicating a storage location of the group information, which is acquired through installer building software when building the installer software for installing a universal printer driver which is configured to select an output destination from among the plurality of image forming apparatuses, the installer software being built by the installer building software, as software which is different from the installer building software, and the group information relating to information which classifies the plurality of image forming apparatuses into groups and specifies one or more image forming apparatuses belonging to each of the groups;

second processing for notifying about the group information or the address information to prompt group setting of the plurality of image forming apparatuses when installing the universal printer driver by using the installer software; and third processing for selecting an image forming apparatus as an object of control out of the one or more image forming apparatuses specified by the group information notified about or acquired from the storage location indicated by the address information, when the universal printer driver is executed;

wherein the plurality of image forming apparatuses are classified into a plurality of groups, and wherein the second processing further comprises:

identifying a terminal of a user which is installing the universal printer driver;

specifying a predetermined group corresponding to the user among the plurality of groups; and notifying about group information specifying one or more image forming apparatuses belonging to the specified group or address information of the group information.

7. The control device setting method of claim 6, further comprising:

fourth processing for creating the group information before the first processing.

8. The control device setting method of claim 6, wherein the third processing comprises selecting an image forming apparatus as an object of control out of the one or more image forming apparatuses belonging to the predetermined group.

* * * * *